April 7, 1964 R. A. WEISENBERGER, SR 3,127,965
PLASTIC TRIM MOLDING CLIP WITH PROTECTIVE FLANGE
Filed Oct. 12, 1959 2 Sheets-Sheet 1

INVENTOR
Robert A. Weisenberger, Sr.
BY
R. P. Barnard
ATTORNEY

April 7, 1964   R. A. WEISENBERGER, SR   3,127,965
PLASTIC TRIM MOLDING CLIP WITH PROTECTIVE FLANGE
Filed Oct. 12, 1959   2 Sheets-Sheet 2

INVENTOR.
Robert A. Weisenberger, Sr.
BY
R. P. Barnard
ATTORNEY

United States Patent Office 3,127,965
Patented Apr. 7, 1964

3,127,965
PLASTIC TRIM MOLDING CLIP WITH
PROTECTIVE FLANGE
Robert A. Weisenberger, Sr., Detroit, Mich., assignor to General Motors Corporation, Detroit, Mich., a corporation of Delaware
Filed Oct. 12, 1959, Ser. No. 845,941
5 Claims. (Cl. 189—88)

The present invention relates to a unique type of non-metallic trim strip retaining molding clip which is constructed in such a way as to greatly reduce the possibility of rusting between the trim strip and a vehicle body wall on which the strip is mounted.

In the past it has been the practice to mount decorative trim strips on vehicle bodies through clips suitably secured to the strips and which clips include portions extending through openings in the vehicle body to retain the clip and mold strip to the body such that at least a portion of the trim strip abuttingly engages the vehicle body. It has been common for the body paint surface adjacent said strips to be damaged due to the striking or abrading of the clip thereagainst. This condition coupled with the tendency of moisture to collect in the damaged or weakened areas makes the incidence of corrosion high in such areas.

In the present invention a unique molding clip has been designed in such a way as to prevent direct contact between the molding strip and the vehicle body. This is achieved by providing a non-metallic molding clip which includes a plurality of lips or flanges adapted to project outwardly from the main body of the clip so as to extend between the molding strip and the adjacent supporting wall. As described in copending application Serial No. 842,422, Meyer, the use of a plastic molding clip itself has considerably reduced corrosion in the area of such mounting trim strips and the present improved design further insures that additional body areas adjacent the strips will be protected against corrosion.

The details as well as other objects and advantages of the present invention will be apparent from the detailed description which follows.

Figure 1:
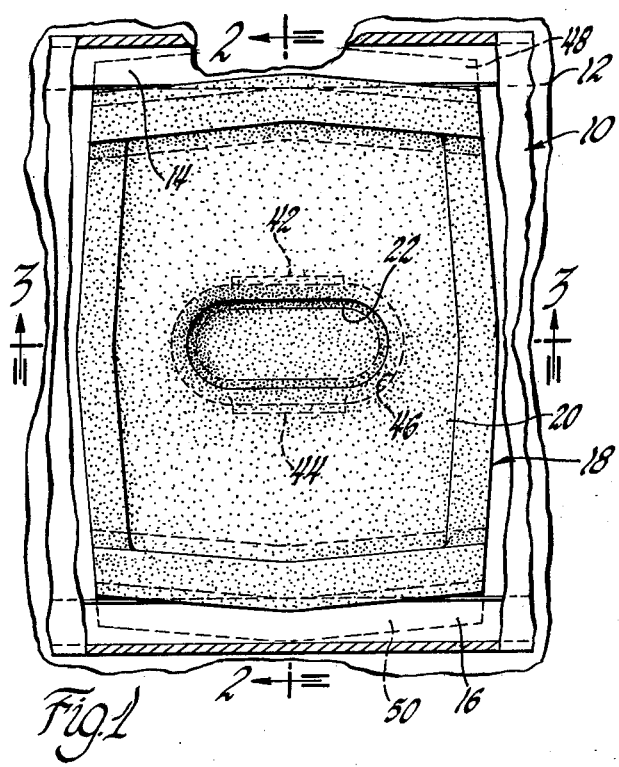
Figure 2:
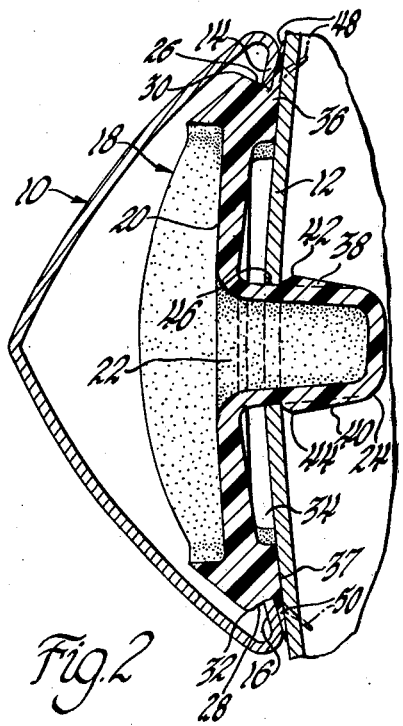
Figure 3:
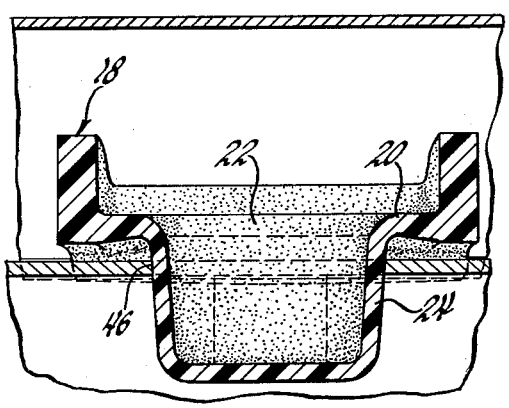
Figure 4:
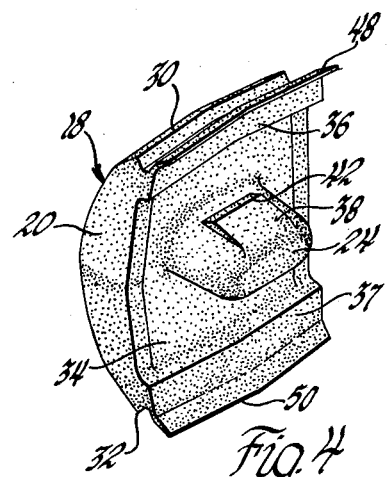
Figure 5:
Figure 6:
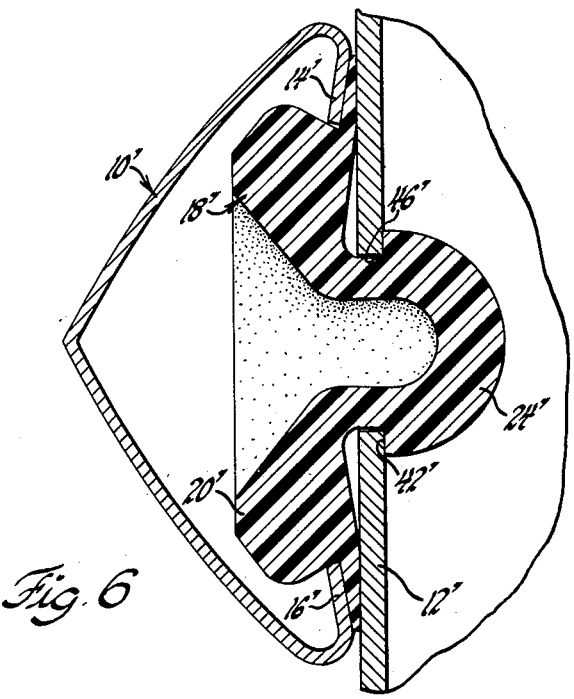
Figure 7:
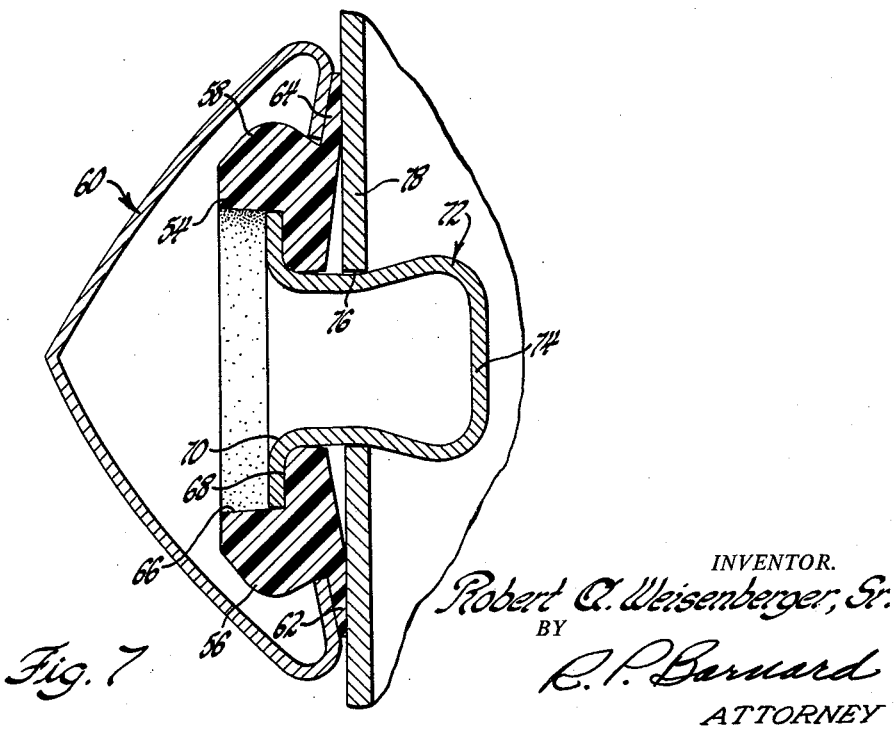

In the drawings:
FIGURE 1 is a broken away view of a trim strip utilizing the subject molding clip;
FIGURE 2 is a view along line 2—2 of FIGURE 1;
FIGURE 3 is a view along line 3—3 of FIGURE 1;
FIGURE 4 is an isometric view of the molding clip;
FIGURE 5 is an enlarged fragmentary view of the molding clip showing the molding strip spacing lip in greater detail; and
FIGURES 6 and 7 are modified forms of clip members.

While the present invention is of general utility, it is particularly adapted for use in mounting a decorative trim or molding strip 10 on a vehicle body wall 12. Trim strip 10 is of conventional construction and includes inwardly rolled edges 14 and 16 adapted to be disposed in proximate relationship to wall 12.

A molding strip mounting clip 18 includes a main body portion 20 having a recessed or hollow portion 22 extending within an axially elongated locking portion 24 projecting axially beyond clip body portion 20. Edge surfaces 26 and 28 of body portion 20 are outwardly flared to provide shoulders 30 and 32 over which molding strip edges 14 and 16 may be snapped to retain the molding strip to the clip. With the particular type of clip illustrated, it is the practice to mount clip 18 on the vehicle body wall and thereafter snap the molding trim strip thereover.

The surface of clip body portion 20 adjacent locking portion 24 is recessed at 34 to provide a pair of longitudinally extending pads or feet 36 and 37. As best seen in FIGURE 2, feet 36 are disposed adjacent strip locking shoulders 30 and 32.

As best seen in FIGURES 2 and 4, clip locking projection 24 includes tapered surfaces 38 and 40 which form locking shoulders 42 and 44 adapted to coact with a clip supporting hole 46 formed in wall 12. Inasmuch as clip 18 is made of a flexible plastic material, it is apparent that when the clip is to be mounted in wall hole 46, clip projection 24 is aligned with the hole and inserted therein causing the hollow projection to temporarily collapse until such time as the locking shoulders 42 and 44 are disposed fully within the wall after which the projection will expand to its normal shape locking the clip in position as shown in FIGURE 2.

To prevent molding strip 10 from abuttingly engaging wall 12 and thereby to protect the painted surface of the wall against damage, thinly tapered lips or flanges 48 and 50 are formed on clip body portion 20 and extend outwardly from feet 36 and 37. As seen in FIGURE 2, lips or flanges 48 and 50 extend outwardly from body portion 20 so as to space molding strip edges 14 and 16 from wall 12 thereby eliminating direct contact between the strip and the wall. It is also to be noted that flanges 48 and 50 do not extend beyond molding strip 10 in order to preclude a casual observance of the flanges.

A modified form of clip is shown in FIGURE 6 and varies from the earlier modification solely in the shapes of clip body 20' and locking projection 24'. Since the modification of FIGURE 6 is otherwise the same as the earlier modification the various part numbers are distinguished by the use of primes (').

In the event it should be desired to make the clip out of two parts for ease of manufacture or to utilize resilient materials having different characteristics, an additional modified type clip is shown in FIGURE 7. In this case, the clip includes a separate body 54 having flared shoulders 56—58 for retaining molding strip 60. Body 54 also includes molding spacing flanges 62—64. However, in this instance clip body 54 is recessed at 66 and provides a seat 68 adapted to receive flanged end 70 of a hollow locking member 72.

Locking member 72 is generally flared to provide a bell bottom 74 which provides the locking engagement with aperture 76 in wall 78.

It is apparent that other structural modifications may be made within the inventive concept taught within the scope of the hereinafter appended claims.

I claim:
1. A molding strip mounting assembly comprising a wall having an opening therein, a resilient clip including a body portion, a locking portion being centrally disposed on said body portion and extending in a generally normal direction therefrom, a plurality of locking shoulders formed on said locking portion, said shoulders being adapted to coact with the wall opening to retain the clip body portion in abutting relation with the wall, a pair of outwardly flared shoulders formed on said clip body portion, a molding strip having a pair of inwardly turned edges and adapted to be snapped into position over said clip, said edges being adapted to coact with the flared shoulders of said body portion to retain the molding strip upon said clip whereby the strip edges are disposed proximate said wall, a pair of outwardly extending flanges formed on said clip body portion and extending transversely the width of said body portion, said clip flanges extending between said strip edges and said wall and in engagement with said strip edges and said wall to prevent direct contact between said strip and said wall.

2. A molding strip mounting assembly comprising a wall having an opening therein, a resilient plastic clip including a hollow body portion, said portion including a central extension, a plurality of tapered shoulders formed on said extension, said shoulders being adapted to coact with the wall opening to retain the clip body portion in abutting relation with the wall, a pair of outwardly flared shoulders formed on said clip body portion, a molding strip having a pair of inwardly turned edges, said strip being adapted to be snapped into position over said clip and said edges being adapted to coact with the flared shoulders of said body portion to retain the molding strip upon said clip, a pair of outwardly extending flanges formed on said clip body portion proximate said flared shoulders and extending transversely the width of said body portion, said clip flanges extending between said strip edges and said wall and in engagement with said strip edges and said wall to prevent direct contact between said strip and said wall.

3. A molding strip mounting clip, said clip including a hollow body portion, said portion including a central extension, a plurality of shoulders formed on said projection for locking said clip within a suitably apertured wall structure, a pair of outwardly flared molding strip retaining shoulders formed on said clip body portion, a pair of outwardly extending flanges formed on said clip body portion and extending transversely the width of said body portion, said clip flanges being adapted to engage both the molding strip and the clip supporting wall to prevent direct contact between the molding strip and the clip supporting wall.

4. A molding strip mounting clip as set forth in claim 3 in which the clip flanges extend outwardly beyond said flared shoulders.

5. A molding strip mounting assembly comprising a wall having an opening therein, a resilient clip including a body, means associated with said body and adapted to project through said wall opening to retain said body to said wall, a pair of outwardly flared shoulders formed on said clip body, a molding strip having a pair of inwardly turned edges and adapted to be snapped into position over said clip, said edges being adapted to coact with the flared shoulders of said body to retain the molding strip upon said clip whereby the strip edges are disposed proximate said wall, a pair of outwardly extending flanges formed on said clip body and extending transversely along the width thereof, said clip flanges extending between and engaging said strip edges and said wall to prevent direct contact between said strip and said wall.

References Cited in the file of this patent

UNITED STATES PATENTS

| | | |
|---|---|---|
| 1,930,734 | Weinstein | Oct. 17, 1933 |
| 2,221,124 | Wiley | Nov. 12, 1940 |
| 2,271,495 | Hall | Jan. 27, 1942 |
| 2,540,790 | Kost | Feb. 6, 1951 |
| 2,681,716 | Black | June 22, 1954 |
| 2,948,937 | Rapata | Aug. 16, 1960 |
| 2,983,008 | Von Rath | May 9, 1961 |
| 2,984,877 | Perrochat | May 23, 1961 |
| 3,018,529 | Perrochat | Jan. 30, 1962 |